United States Patent [19]

Corson

[11] Patent Number: 4,790,588
[45] Date of Patent: Dec. 13, 1988

[54] AUTOMOBILE BODY CONVERSION SYSTEM

[76] Inventor: Randall G. Corson, 317 E. Acapulco La., Phoenix, Ariz. 85022

[21] Appl. No.: 63,994

[22] Filed: Jun. 19, 1987

[51] Int. Cl.4 ............................................. B60R 27/00
[52] U.S. Cl. .................................... 296/1.1; 180/69.21; 29/401.1
[58] Field of Search ................ 296/185, 26, 203, 205, 296/197, 194, 35.3, 193, 1 R, 29, 188, 189, 196, 187; 293/106, 107, 110, 133, 155; 29/401.1; 180/69.21

[56] References Cited

U.S. PATENT DOCUMENTS 2,074,469  3/1937  Haynes ................................ 293/107
4,359,119 11/1982  Kammerman ..................... 180/69.21

Primary Examiner—Robert B. Reeves
Assistant Examiner—Brian Sells
Attorney, Agent, or Firm—Cahill, Sutton & Thomas

[57] ABSTRACT

A system for replacing component parts of an automobile body to alter the appearance of the vehicle. The system includes a frame for attachment to the chassis of the automobile in place of the original bumper. The frame effectively lengthens the chassis and provides support for a hood that is longer than the original hood. The frame carries hinges attached to the hood and also carries lifts which bias the hood upwardly for easy opening.

5 Claims, 2 Drawing Sheets

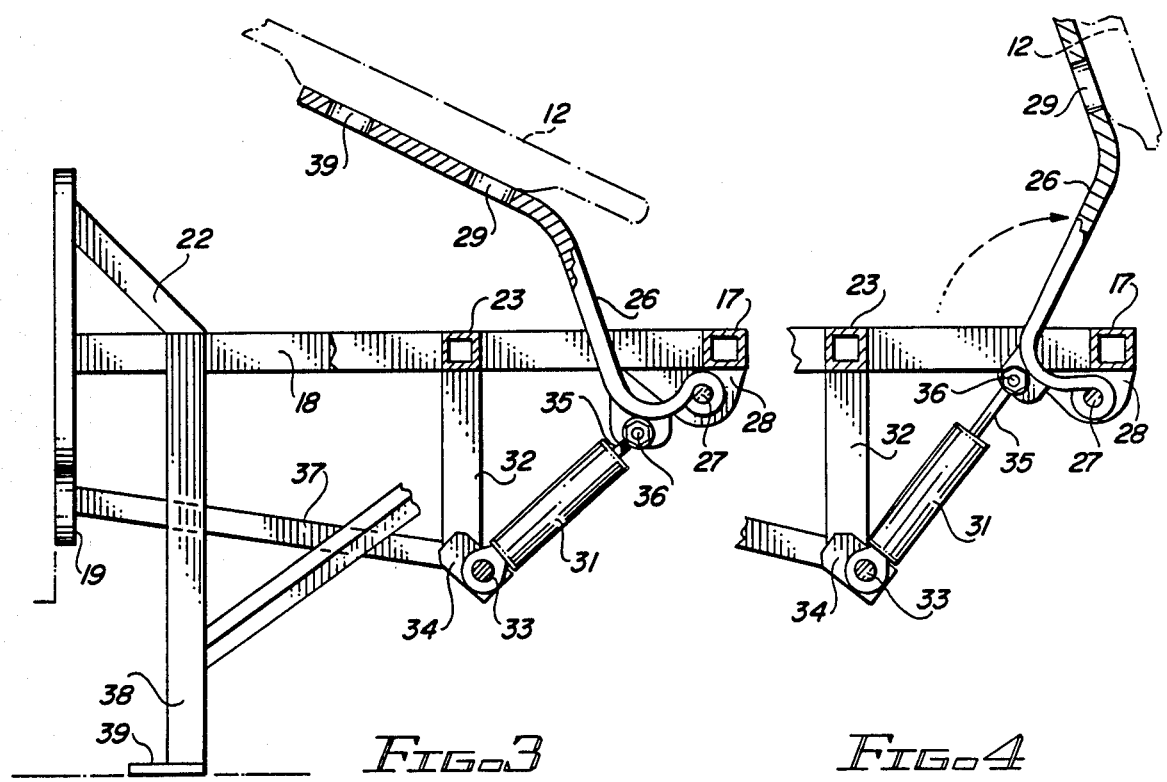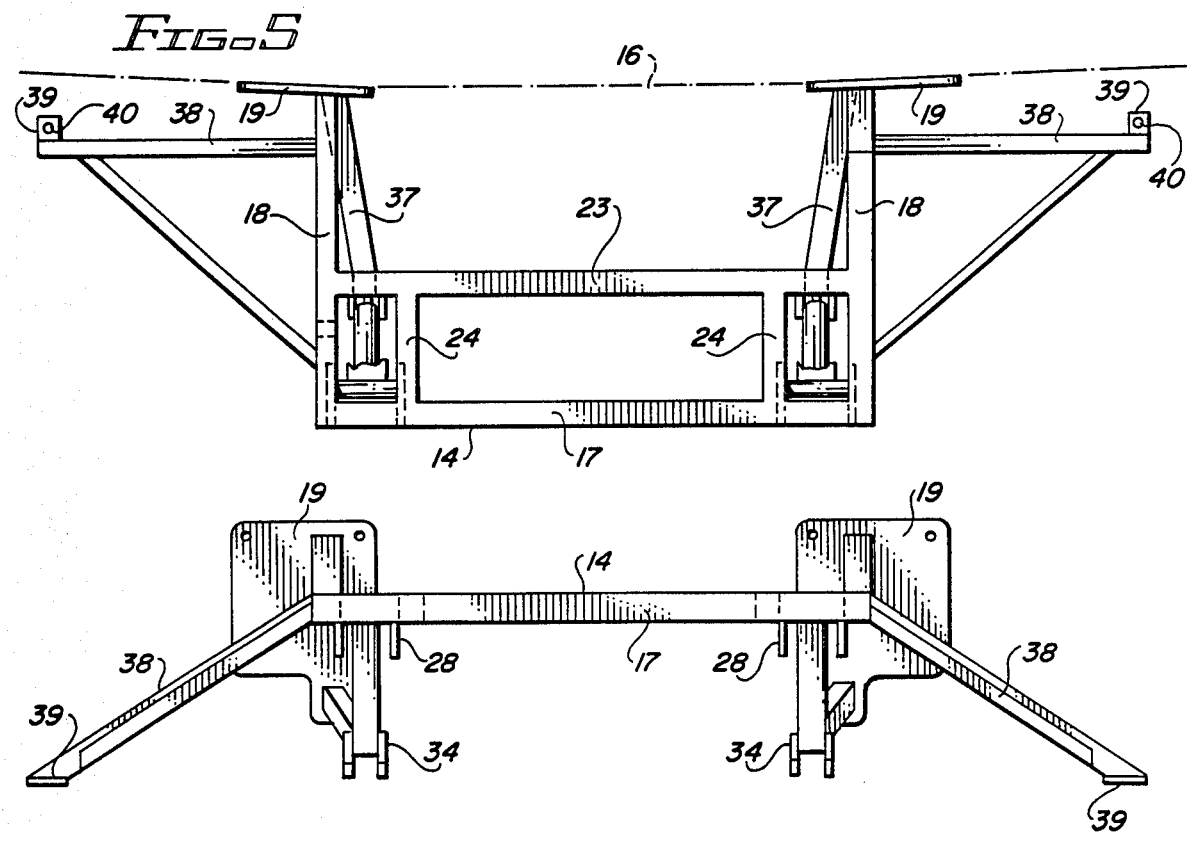

AUTOMOBILE BODY CONVERSION SYSTEM

TECHNICAL FIELD

This invention relates to kits of automobile body components which replace original components to alter the appearance of a vehicle.

BACKGROUND ART

There are on the market today numerous kits for replacing the bodies of various automobiles. The vehicle owner is usually motivated to change the body for a racier or more stylish appearance. Or he may wish to have his vehicle resemble a more expensive model.

These kits come in various degrees of complexity; some requiring considerable skill to assemble on to a vehicle. Obviously, the market for any particular kit can be enlarged by simplifying the kit to a degree where the average vehicle owner with little or no mechanical skills can assemble the kit.

It often is the case that to produce the desired conversion result, e.g. the creation of a racier appearance for the vehicle, the conversion body must be longer than the automobile's original body. With many existing kits affixing the longer body to the original chassis has required the converter to fabricate or assemble special structures to support and affix the longer body components. This has complicated, rather than simplified, the conversion kit and its utilization.

DISCLOSURE OF THE INVENTION

This invention contemplates a conversion system, or kit, which includes as a component thereof a frame which can be affixed to the chassis of the automobile in the location of and using the fastening means for the original bumper of the vehicle. This pre-fabricated frame is easily attached to the chassis, effectively lengthening the chassis, and providing support for the longer body components, such as a hood and a lower front or lower rear panel of the vehicle. The frame has mounting means incorporated therein by which the frame is attached to the chassis in the location formerly occupied by a bumper.

The frame carries hinge means which support the hood and permit it to be lifted and opened. The frame also preferably carries lift means cooperating with the hinge means to bias the hood toward its open position to make it easier to open.

BRIEF DESCRIPTION OF THE DRAWINGS

The invention is described in greater detail hereinafter by reference to the accompanying drawings wherein:

FIG. 3 is an enlarged side elevational view of the frame shown in FIG. 2 with portions broken away to show a hinge mechanism carried by the frame;

FIG. 4 is an enlarged fragmentary view of the frame illustrating the hinge mechanism in a different position;

FIG. 5 is a plan view of the frame; and

FIG. 6 is a front elevational view of the frame.

BEST MODE FOR CARRYING OUT THE INVENTION

Figure 1:
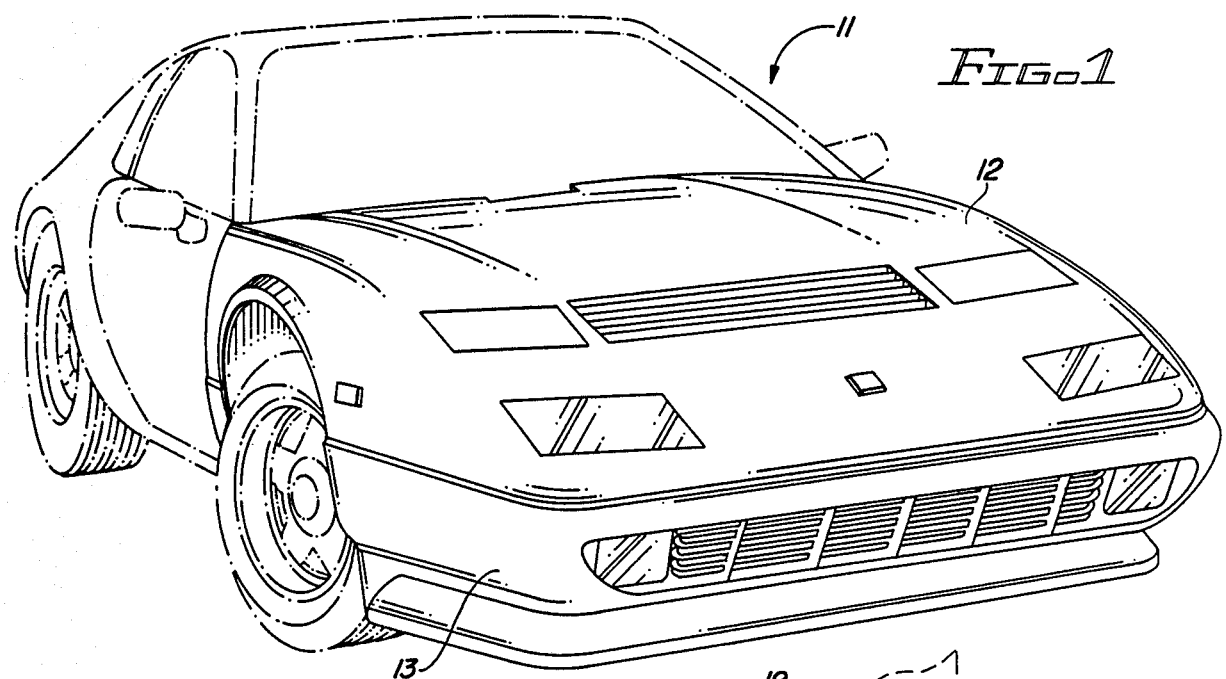
FIG. 1 is a three-quarter front perspective view of an automobile equipped with the conversion system of this invention; portions of the body of the vehicle are shown in phantom.

Illustrated in FIG. 1 is an automobile which has had a conversion system, or kit, applied thereto in accordance with this invention in order to give the automobile a more stylish and racier appearance. As is typical of a sports car type automobile the vehicle has a low and elongated body which creates the visual effect of sleekness and speed. This is the effect usually desired by persons applying conversion systems to their automobiles.

The conversion system of this invention can be utilized, for example, in altering the appearance of the body of a Fiero model Pontiac brand automobile to ressemble a Ferrari automobile. The Fiero Pontiac lends itself to such a conversion because it has an integral chassis structure which carries a plurality of molded plastic panels which make up the exterior body of the vehicle. The original panels can be replaced with other panels molded to different shapes to give the vehicle a different appearance. The achievement of a Ferrari-like appearance for the Fiero Pontiac, however, requires that the conversion body be considerably longer than the original body of the Fiero Pontiac, a conversion feature that is likely to occur with other types of automobiles as well.

In FIG. 1 the automobile generally is indicated by reference numeral 11. One of the principal appearance features of the converted automobile body is an elongated hood 12 which generally comprises the entire upper portion of the forward region of the automobile. As with many conversion systems, hood 12 is much longer and, likely, much heavier than the original hood employed on automobile 11. This invention provides a conversion system by which this enlarged hood 12 can be attached to and manipulated on the automobile 11 for the desired appearance of the automobile. The desired style also dictates that the lower front panel, or nose, 13 of the body be considerably longer than the similar component of the original body. Support for the nose 13 is also provided by this invention.

Figure 2:
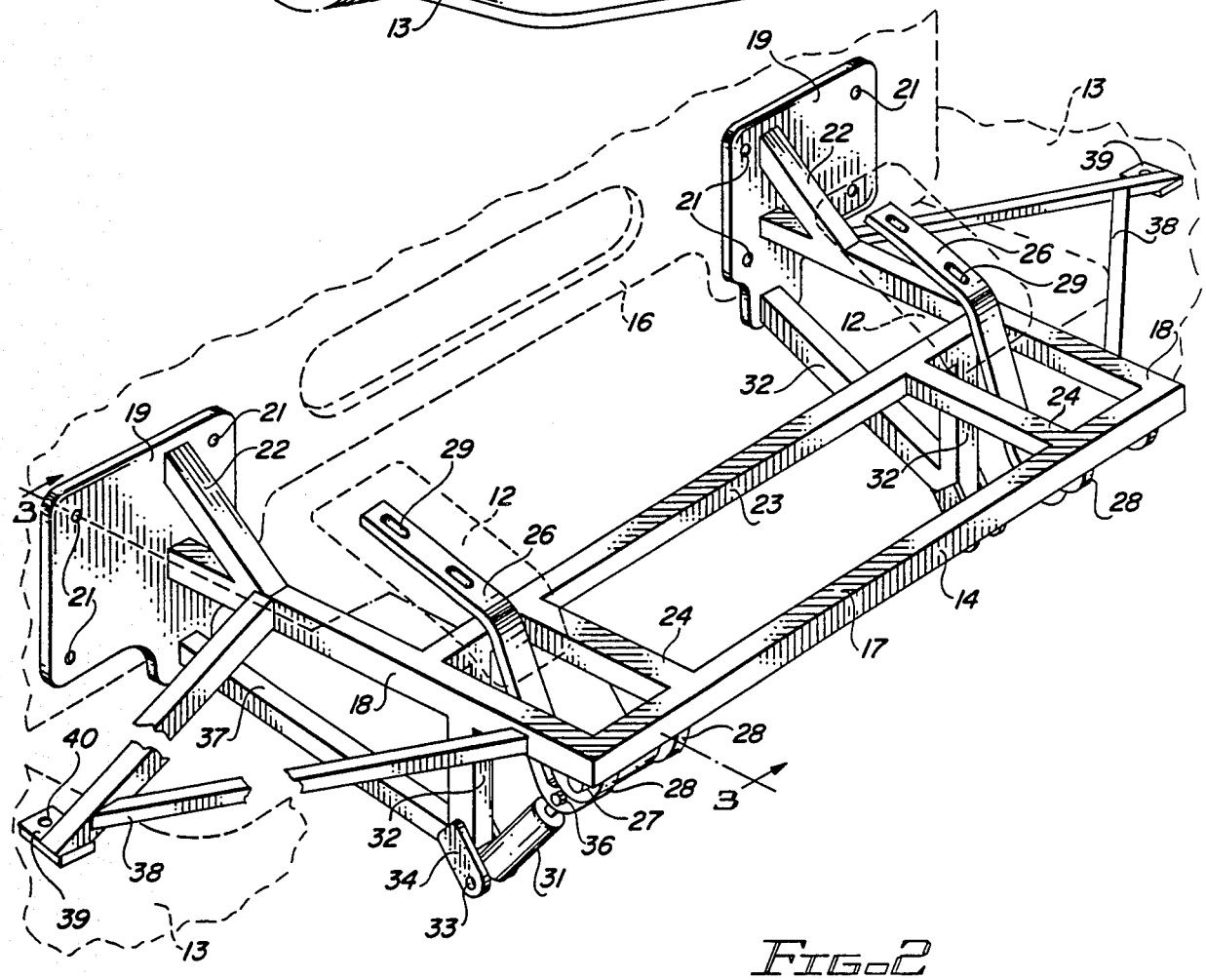
FIG. 2 is a three-quarter front perspective view of a frame forming a part of the conversion system of this invention; portions of the chassis and the body of the automobile are shown in phantom.

In the conversion system of this invention elongated body components, namely the hood and the nose 13, are accompanied by a frame 14, shown in FIG. 2. Frame 14 is adapted to be mounted on the chassis of the automobile 11. The chassis is shown in phantom in FIG. 2 and designated generally by reference numeral 16. Frame 14 is generally U-shaped and is preferably formed of welded steel tubing to provide a transverse leg 17 at its forward, closed, end and two parallel side legs 18. At the rear, or open end of the U-shaped frame 14 there is provided means for mounting the frame on the chassis 16 of the automobile. This mounting means may take the form of one or more mounting plates 19 secured to the rear ends of side legs 18. The mounting plates 19 have a pattern of fastener receiving openings 21 therein which match the pattern of fasteners utilized to attach the original bumper of automobile 11 to the chassis 16. These fasteners may take the form of studs secured to the chassis 16 or bolt-nut combinations adapted to pass through fastener openings 21 and complementary openings in the chassis 16.

By constructing the mounting plates 19 of the mounting means of frame 14 to be compatible with the original bumper fastening system the effort required to affix the frame 14 to the chassis 16 is minimized, thus simplifying the conversion process. It will be appreciated that the mounting means can take the form of twin plates 19 or a single plate could be utilized for this purpose. In either event it is desirable to provide angled braces 22 from upper regions of the mounting plates 19 to an intermediate portion of each side leg 18 to strengthen frame 14.

Further strengthening and stiffening of frame 14 can be accomplished by providing another transverse leg 23 spaced rearwardly of forward leg 17 and secured at its ends to side legs 18. The forward corners of the frame 14 can be further strengthened by providing spacer legs 24 inboard of side legs 18 and extending between the forward transverse leg 17 and the other transverse leg 23.

In accordance with this invention, the forward region of frame 14, i.e. the region in a vicinity of forward transverse leg 17, carries hinge means for attaching the hood 12 to frame 14. This hinge means comprises a pair of brackets 26 having hinge pins 27 passing through the forward regions thereof. The hinge pins 27 of each bracket 26 also passes through a pair of mounting lugs 28 welded or otherwise affixed to the bottom surface of transverse leg 17. (See FIGS. 2 and 3).

The forward hinged region of each bracket 26 is curved so that the bracket projects upwardly through the reinforced corner region of frame 14. In other words, each bracket extends upwardly through a space provided between a side leg 18, a spacer leg 24, forward transverse leg 17 and intermediate transverse leg 23 (See FIG. 3). The extremity of each bracket 26 has fastener openings 29 therein to receive fasteners by which the hood 12 is secured to the brackets 26. These fasteners may take the form of studs molded in place in the hood. The hood, like most major body components in a conversion kit, is preferably formed of glass reinforced plastic material. It is quite convenient to mold fastener elements in place in these body components as they are molded.

Hood 12 is opened to gain access to the interior of the vehicle by raising the hood so that it swings on brackets 26 which pivot about their hinge pins 27 (See FIGS. 3 and 4). It will be noted from FIG. 1 that the hood 12 may comprise the entire upper forward body portion of the automobile. Because of its size the hood 12 is quite heavy and it is, therefore, desirable to provide some assistance to the person lifting and opening the hood. This assistance is provided by lift means in the form of gas struts 31 associated with the hinge means for the hood 12.

Each gas strut 31 is preferably mounted on a tubular support 32 depending from transverse frame member 23. Each support 32 is aligned with its respective hinge bracket 26. Each strut 31 has the lower end of its cylinder portion pivotally attached at 33 to bosses 34 welded to the lower end of its depending support 32. The opposite, or piston rod end 35, of each strut is pivotally connected at 36 to its respective hinge bracket 26. Gas struts 31 are constructed to generate forces tending to push the piston rod 35 out of the cylinder to the position shown in FIG. 4. In this manner the lift struts bias hood 12 upwardly toward its open position. The forces generated by struts 31 are sufficient to hold the hood in its open position until it is desired to be closed.

Frame 14 is also used to support a lower front panel, or nose, 13 body component. Tubular outrigger support members 38 extend outwardly from each side leg 18 of the frame 14. Each outrigger member 38 has a mounting plate 39 affixed to the outer end thereof and each mounting plate has an opening 40 therein for receiving a fastener (not shown) formed in nose 14. The nose fasteners may, like those for the hood 12, be molded in place studs placed there during molding of the nose 13.

It will thus be appreciated that the invention provides a conversion system in which the body of the automobile can be effectively extended in length beyond the length of the original body. Although the invention has been described by reference to a body conversion system applicable to the front hood and nose of the automobile, the principles thereof are equally applicable to rear hood and lower rear panel, or tail, body portions of the automobile.

What is claimed is:

1. An automobile conversion system comprising a frame, mounting means positioned at one end portion of the frame, said mounting means comprising at least one upright plate member having fastener receiving openings therein adapted to be aligned with fasteners by which the bumper is mounted on the automobile, hinge means positioned in the opposite end portion of the frame, and a hood member carried by said hinge means and extending over said frame and a portion of said automobile, said hinge means permitting said hood to move upwardly about the hinge means to expose an interior region of the automobile.

2. The conversion system of claim 1 further characterized in that said frame has outrigger member extending from opposite sides thereof for supporting another component of the automobile body.

3. The conversion system of claim 1 further comprising lift means associated with said hinge means for biasing said hood upwardly.

4. An automobile conversion system comprising a frame, said frame comprising a U-shaped tubular member having open and closed ends, mounting means attached to the open end of said tubular member, said mounting means being adapted to be mounted at the bumper mounting region of the automobile, hinge means mounted at the closed end of said tubular member, a hood member carried by said hinge means and extending over said frame and a portion of said automobile, said hinge means permitting said hood to move upwardly about the hinge means to expose an interior region of the automobile, a tubular support depending from said tubular member, and lift means connected to said support and said hinge means for biasing said hood upwardly.

5. The conversion system of claim 4 further comprising tubular outrigger members extending from opposite sides of said tubular member for supporting another component of the automobile body.

* * * * *